United States Patent
Zou

(10) Patent No.: US 9,385,548 B2
(45) Date of Patent: Jul. 5, 2016

(54) CHARGER WITH REPLACEABLE PLUG

(71) Applicant: DONGGUAN YUHUA ELECTRONICS TECHNOLOGY CO., LTD., Dongguan (CN)

(72) Inventor: Qing Zou, Dongguan (CN)

(73) Assignee: DONGGUAN YUHUA ELECTRONICS TECHNOLOGY CO., LTD., Dongguan, Guangdong (CN)

( * ) Notice: Subject to any disclaimer, the term of this patent is extended or adjusted under 35 U.S.C. 154(b) by 42 days.

(21) Appl. No.: 14/125,355

(22) PCT Filed: Feb. 28, 2013

(86) PCT No.: PCT/CN2013/071970
§ 371 (c)(1),
(2) Date: Dec. 11, 2013

(87) PCT Pub. No.: WO2013/131439
PCT Pub. Date: Sep. 12, 2013

(65) Prior Publication Data
US 2014/0375268 A1    Dec. 25, 2014

(30) Foreign Application Priority Data

Mar. 9, 2012   (CN) .................. 2012 2 0088330 U

(51) Int. Cl.
*H02J 7/02*   (2016.01)
*H02J 7/00*   (2006.01)
*H01R 31/06*  (2006.01)

(52) U.S. Cl.
CPC ............ *H02J 7/0042* (2013.01); *H01R 31/065* (2013.01); *H02J 7/0052* (2013.01)

(58) Field of Classification Search
USPC ........................................................ 320/111
See application file for complete search history.

(56) References Cited

U.S. PATENT DOCUMENTS 5,648,712 A * 7/1997 Hahn ..................... H01R 27/00
320/111

FOREIGN PATENT DOCUMENTS

CN           201887494 U  *  6/2011

* cited by examiner

*Primary Examiner* — Richard Isla Rodas
*Assistant Examiner* — David V Henze-Gongola

(57) ABSTRACT

A charger with a replaceable plug includes a charger body; a groove is provided on an end portion of a lateral surface of the charger body, and a folding plug is hinged in the groove. A removable plug is also plugged in the groove, and the removable plug is formed of a support, conductive pins and positioning raised ribs disposed on the support, and conductive metal elastic pieces connected with the conductive pins; an end face of the positioning raised ribs, facing the conductive pins of the folding plug is provided with connecting holes matching the conductive pins, and the conductive metal elastic pieces are arranged in the connecting holes. When the positioning raised ribs are plugged into the groove, the conductive metal elastic pieces are tightly connected with the conductive pins of the folding plug. The present invention is simple in structure and convenient to use.

4 Claims, 2 Drawing Sheets

CHARGER WITH REPLACEABLE PLUG

BACKGROUND OF THE INVENTION

1. Field of the Invention

The present invention relates to a charger, and more particularly to a charger with a replaceable plug.

2. Description of the Prior Art

A charger must comply with the demand of safety because it relates to strong current. The specification for plugs in each country is different, and the demand for certification is also different. Therefore, to development a universal charger for different countries, different AC plugs, and different demands of certification becomes very important.

The existing chargers are a one-piece formed structure, namely, the plug and the charger body are integrally formed by injection molding. The plug and the charger body cannot be detached from each other. Thus, chargers sold to different countries must be designed according to different demands. If the orders for chargers are uncertain or the demands for certification are unknown, this will cause the logistics in the passive situation. In addition, the cost is increased. The existing charger having a replaceable plug uses a button to fix the replaceable plug. After using many times, the plug may detain on the socket when the charger is unplugged. Without safety protection, it may bring an electric shock. Accordingly, the inventor of the present invention has devoted himself based on his many years of practical experiences to solve this problem.

SUMMARY OF THE INVENTION

The primary object of the present invention is to provide a charger with a replaceable plug to overcome the shortcomings of the prior art. The charger is simple in structure and convenient to use, and has a good effect.

In order to achieve the aforesaid object, a charger with a replaceable plug of the present invention comprises a charger body. The charger body has a groove at an end portion of a side of the charger body. A folding plug is hinged in the groove. A removable plug is plugged in the groove. The removable plug comprises a support, conductive pins and positioning raised ribs disposed on the support, and conductive metal elastic pieces electrically connected with the conductive pins. The positioning raised ribs have connecting holes at ends thereof facing two conductive pins of the folding plug for insertion of the conductive pins. The conductive metal elastic pieces are respectively disposed in the connecting holes. When the positioning raised ribs are plugged into the groove, the conductive metal elastic pieces are tightly connected with the conductive pins of the folding plug.

Preferably, the groove is composed of two parallel elongated grooves. The folding plug is composed of the two mating conductive pins which are respectively hinged in the two elongated grooves. The number of the positioning raised ribs is two. The conductive metal elastic pieces are provided in the connecting holes of the two positioning raised ribs. The two positioning raised ribs respectively correspond to the two elongated grooves. The charger body and the removable plug are connected through the groove and the positioning raised ribs.

Preferably, the side wall of the groove has a positioning groove. The positioning groove is parallel to the groove. The positioning raised ribs each have a guide rib corresponding to the positioning groove.

Preferably, the surface of the charger body has a positioning hole between the grooves. The removable plug has a resilient positioning buckle corresponding to the positioning hole.

Accordingly, the present invention comprises an existing charger having a plug combined with a removable plug, so that the charger can be used more conveniently. The removable plug and the charger body are connected through the grooves and positioning raised ribs to enhance stable connection between the removable plug and the charger body. Furthermore, the grooves have positioning grooves along the lengthwise direction, and the positioning raised ribs have guide ribs thereon corresponding to the positioning grooves. Through the positioning hole and the resilient positioning buckle, the removable plug and the charger body are connected and positioned more precisely and stably. The positioning raised ribs of the removable plug comprises the conductive metal elastic pieces therein corresponding to the conductive pins of the folding plug to complete the circuit connection of the removable plug and the charger. In this way, the charger can use a desired plug according to different sockets, so it is flexible, simple and safe for use.

DETAILED DESCRIPTION OF THE PREFERRED EMBODIMENTS

Figure 1:
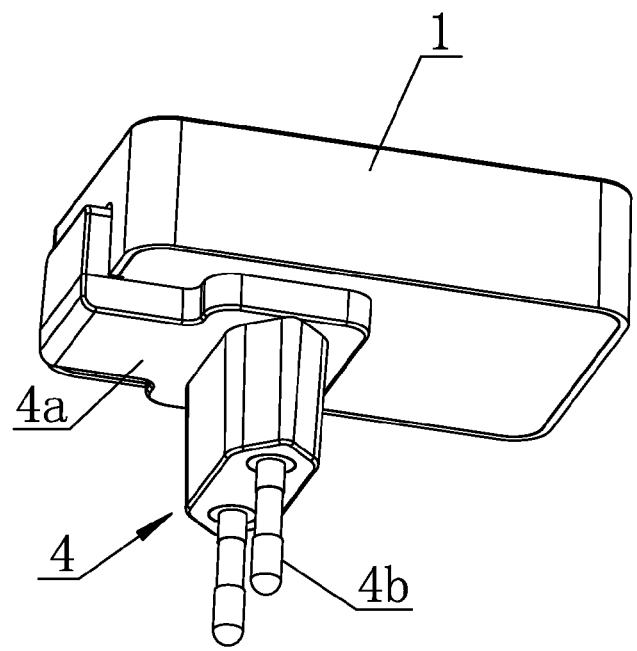
FIG. 1 is a schematic view according to a first embodiment of the present invention.
Figure 2:
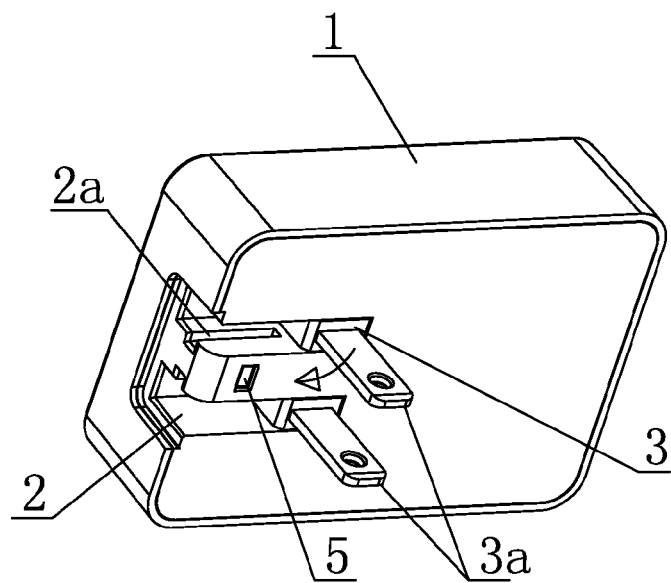
FIG. 2 is a schematic view showing the charger body according to the first embodiment of the present invention.
Figure 3:
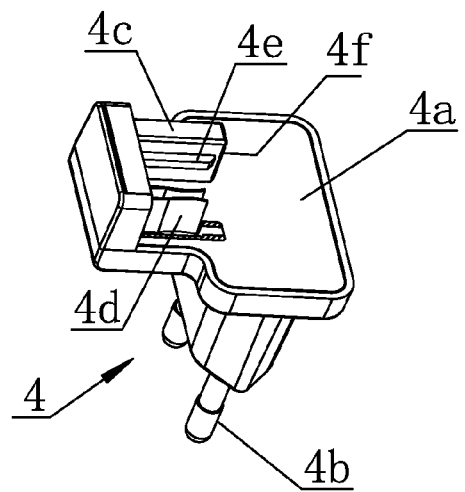
FIG. 3 is a schematic view showing the removable plug according to the first embodiment of the present invention.

Embodiments of the present invention will now be described, by way of example only, with reference to the accompanying drawings.

FIG. 1 to FIG. 6 shows a charger with a replaceable plug according to a first embodiment of the present invention. The present invention comprises a charger body 1. The charger body 1 has a groove 2 at an end portion of a side of the charger body 1. A folding plug 3 is hinged in the groove 2. In this embodiment, the folding plug 3 is a US-type folding plug. Of course, the folding plug 3 may be other types, not limited. A European-type removable plug 4 is also plugged in the groove 2. The removable plug 4 comprises a support 4a, conductive pins 4b and positioning raised ribs 4c disposed on the support 4a, and conductive metal elastic pieces 4d electrically connected with the conductive pins 4b. The positioning raised ribs 4c have connecting holes 4f at ends thereof facing conductive pins 3a of the folding plug 3 for insertion of the conductive pins 3a. The conductive metal elastic pieces 4d are disposed in the connecting holes 4f, respectively, to ensure safe use. When the positioning raised ribs 4c are plugged into the groove 2, the conductive metal elastic pieces 4d are tightly connected with the conductive pins 3a of the folding plug 3 to achieve an electric connection. Specifically, in this embodiment, the groove 2 is composed of two parallel elongated grooves. The folding plug 3 is composed of two mating conductive pins which are respectively hinged in the two elongated grooves. The number of the positioning raised ribs 4c is two. The conductive metal elastic pieces 4d are provided in the connecting holes 4f of the two positioning raised ribs 4c.

The two positioning raised ribs 4c correspond to the two elongated grooves, respectively. The charger body 1 and the removable plug 4 are connected through the groove 2 and the positioning raised ribs 4c. Furthermore, for stable connection of the removable plug 4 and the charger body 1, the side wall of the groove 2 has a positioning groove 2a. The positioning groove 2a is parallel to the groove 2. The positioning raised ribs 4c each have a guide rib 4e corresponding to the positioning groove 2a. The surface of the charger body 1 has a positioning hole 5 between the two elongated grooves 2. The removable plug 4 has a resilient positioning buckle 6 corresponding to the positioning hole 5.

When in use, according to the specification of a socket, the folding plug 3 is folded and received in the grooves 2 when the removable plug 4 is required, and then the positioning raised ribs 4c of the removable plug 4 are plugged into the grooves 2 so that the two conductive pins 3a of the folding plug 3 are inserted into the connecting holes 4f of the positioning raised ribs 4c to connect with the conductive metal elastic pieces 4d for conducting circuit, namely, the connection of the removable plug 4 is completed. The folding plug 3 is hinged in the grooves 2 of the charger body 1. When the removable plug 4 is not required, the conductive pins 3 are turned outward, and then the folding plug 3 can be used separately.

Figure 4:
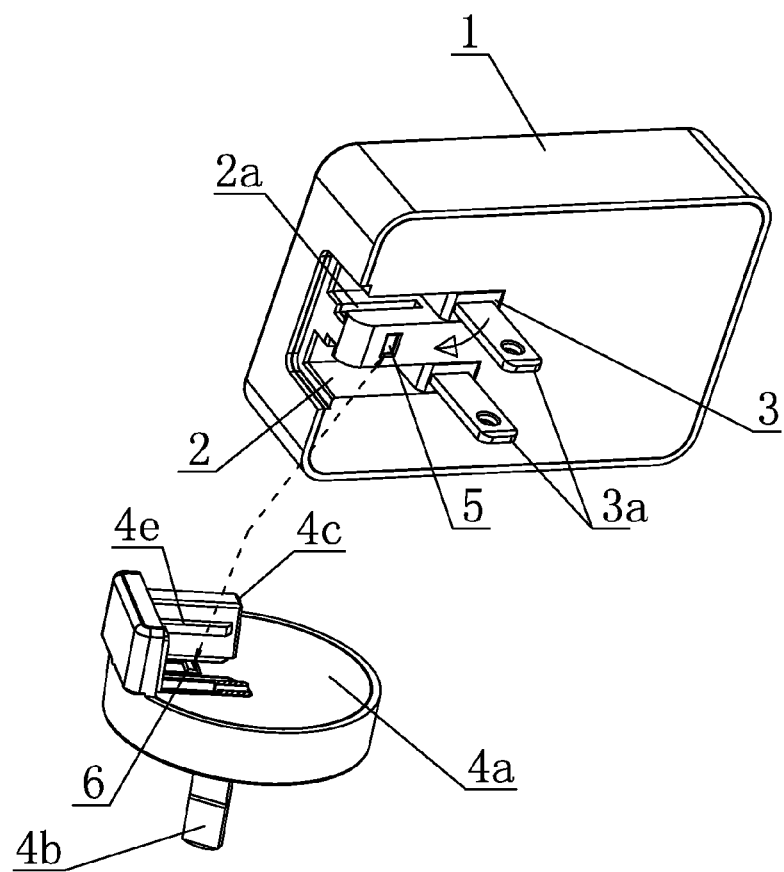
FIG. 4 is an exploded view according to a second embodiment of the present invention.

FIG. 4 shows a charger with a replaceable plug according to a second embodiment of the present invention. The second embodiment is substantially similar to the first embodiment with the exceptions described hereinafter. In this embodiment, the removable plug 4 is an Austrian-type plug. The configuration and use of the charger body 1, the grooves 2, the positioning grooves 2a, the folding plug 3, the conductive pins 3a, the removable plug 4, the support 4a, the conductive pins 4b, the positioning raised ribs 4c, the conductive metal elastic pieces 4d, the guide ribs 4e, the positioning hole 5, the resilient positioning buckle 6 are same as the first embodiment.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A charger with a replaceable plug, comprising
a charger body, the charger body having
a groove at an end portion of a side of the charger body,
a folding plug being hinged in the groove,
a removable plug being plugged in the groove, the removable plug comprising a support,
conductive pins and
positioning raised ribs disposed on the support, and
conductive metal elastic pieces respectively housed completely inside connecting holes of the positioning raised ribs, and disposed in parallel to the positioning raised ribs but perpendicular to the conductive pins and electrically connected with the conductive pins,
the positioning raised ribs having the connecting holes at ends thereof facing two conductive pins of the folding plug for insertion of the conductive pins,
the conductive metal elastic pieces being respectively disposed in the connecting holes,
wherein when the positioning raised ribs are plugged into the groove, the conductive metal elastic pieces are tightly connected with the conductive pins of the folding plug.

2. The charger with a replaceable plug as claimed in claim 1, wherein the groove is composed of two parallel elongated grooves, the folding plug being composed of the two mating conductive pins which are respectively, thereby independently, hinged in the two elongated grooves, the number of the positioning raised ribs being two, the conductive metal elastic pieces being provided in the connecting holes of the two positioning raised ribs, the two positioning raised ribs respectively corresponding to the two elongated grooves, the charger body and the removable plug being connected through the groove and the positioning raised ribs.

3. The charger with a replaceable plug as claimed in claim 2, wherein a side wall of the groove has a positioning groove, the positioning groove being parallel to the groove, the positioning raised ribs each having a guide rib corresponding to the positioning groove.

4. The charger with a replaceable plug as claimed in claim 1, wherein a surface of the charger body has a positioning hole close to the groove, the removable plug having a resilient positioning buckle corresponding to the positioning hole.

* * * * *